Börje August Eliasson
INVENTOR

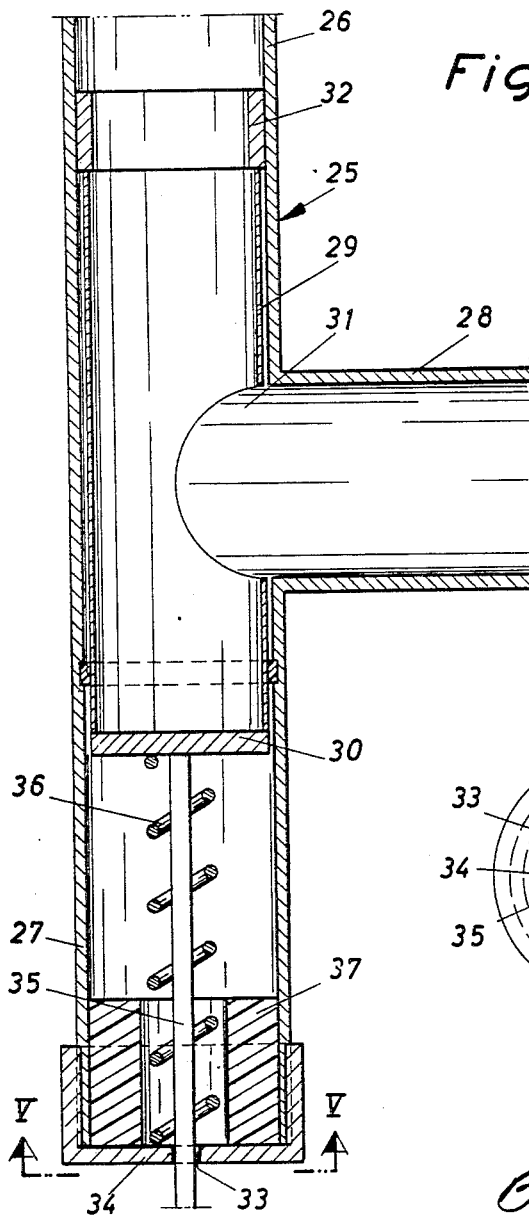
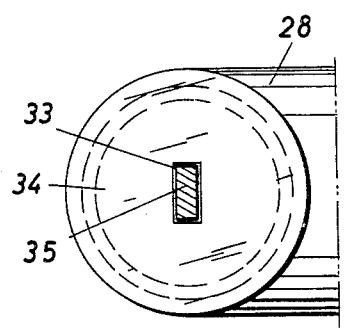

3,473,560
SHUTTING VALVE FOR FLUIDS, IN PARTICULAR
TO BE USED FOR BOMB SHELTERS
August Borje Eliasson, Hackspettsgatan 26,
Goteborg, Sweden
Filed Apr. 22, 1966, Ser. No. 544,613
Claims priority, application Sweden, Apr. 29, 1965,
5,610/65
Int. Cl. F16k *17/30;* F23l *17/00*
U.S. Cl. 137—517                        6 Claims

ABSTRACT OF THE DISCLOSURE

A bomb shelter type shutting valve for instantly closing off the interior of the shelter with outside atmospheric conditions responsive to both positive and negative shock waves following an explosion. The valve assembly includes an axially shifting shutting valve slidably and coaxially disposed within a housing tubing, both having apertures formed therein for registering alignment with each other to permit passage of atmospheric fluid to the interior of the shelter when in the normally open condition. Novelly arranged first and second resilient members normally bias the valve in the open condition and are arranged on closely adjacent opposite sides of the inner closed end of the shutting valve body. The valve is displaceable against the first resilient member responsive to positive atmospheric shock waves to an instantly first closed position to preclude shock waves from entering the shelter and is subsequently displaceable instantly to a second closed position against the resilience of the second resilient members simultaneously responsive to the reaction of the first resilient members and to the subsequent negative atmospheric pressure accompanying a severe explosion. Following the passage of the negative atmospheric pressure of the explosion, the second resilent members react together with the first resilient members to return the valve to its normally biased open condition.

---

At the construction of bomb shelters, attention must be paid so as to prevent a pressure wave—caused e.g. by the explosion of an atomic bomb—from reaching the interior of the shelter or at least to reduce its effect to such a degree that the pressure in the interior of the shelter can be maintained at such a low value that it can be sustained by the persons in the shelter. To this end air valves have been arranged in the wall of the shelter, these air valves being af such a kind that they are automatically closed by the pressure wave. As an example of such a closing valve may be mentioned one having a valve body tapering conically towards the shelter and being pressed against the action of a spring by the pressure wave against a concal seat of a corresponding shape. However, such valves have turned out to have a tendency to be closed already by the action of the negative pressure that is created by the suction fans arranged in the shelter. The air exchange in the shelter is then negatively influenced.

Also the drain pipes for liquid from the shelter are provided with shutting values so as to prevent liquid in the pipe to be pressed by such a pressure wave back to the shelter. Previously known valves for this purpose have had the shape of a flap valve. However, a flap is closed by the pressure valve so slowly that a great portion of the liquid in the pipe is pressed rearwards before the valve has been completely closed.

The purpose of the present invention is to overcome the above recited drawbacks. The main feature of the invention is to be seen therein that the shutting valve comprises a tube-shaped slide adapted to be displaced axially in a cylinder, said slide being closed at its rear end and open at its front end and its mantle wall is provided with at least one opening registering with a corresponding opening in the tube, said slide being, against the action of a spring means or the like, displaceable rearwardly to a position in which the openings do not register with each other. When such a valve is intended to be used in connection with air, it is advisable to provide it with a number of openings in the mantle wall of the slide and in the tube. In such a case there is required only a small axial displacement of the slide for obtaining a complete shutting.

Figure 1:
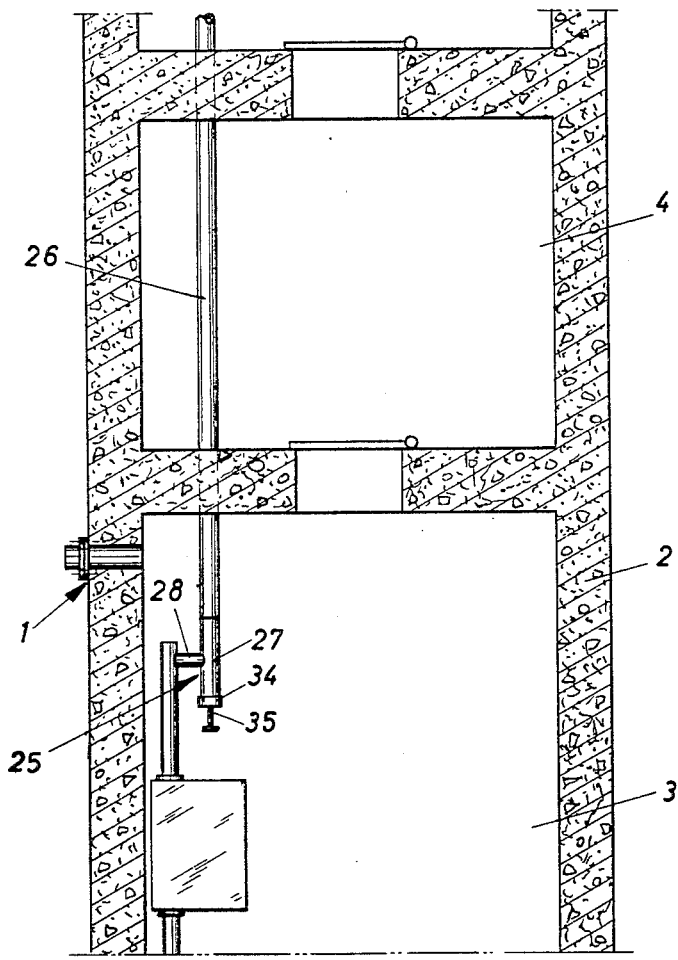

The invention will in the following be described with reference to the accompanying drawings. In the drawings:
FIG. 1 shows a horizontal section through a shelter provided with shutting valves according to the invention,
FIG. 2 shows on an enlarged scale a longitudinal section through a shutting valve for air in open position,
FIG. 3 shows a similar section but with the valve in closed position,
FIG. 4 shows a longitudinal section through a shutting valve for liquid, and FIG. 5 shows a cross section of the valve on the line V—V in FIG. 4.

The shutting valve 1 for air indicated to the left in FIG. 1 is supposed to be arranged in one wall 2 of a shelter 3 with a precouplet lock 4.

Figure 2:
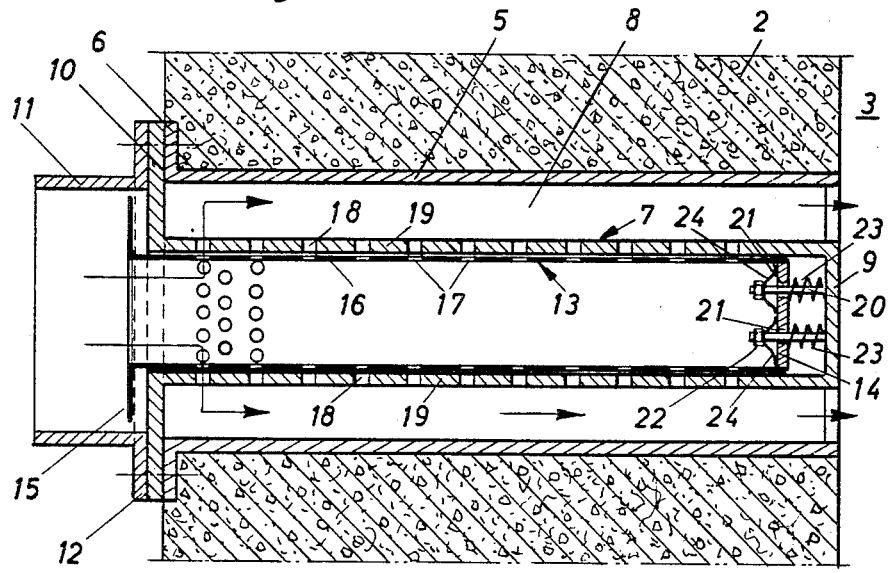
Figure 3:
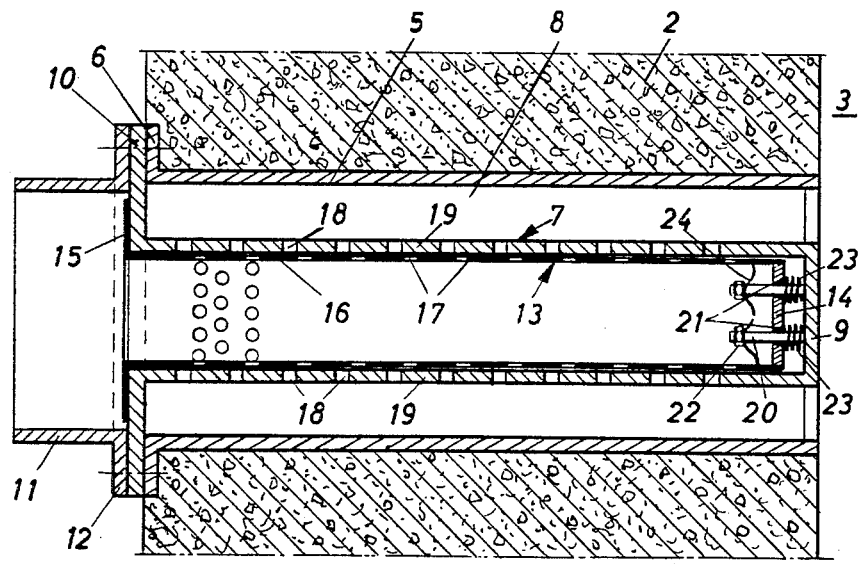

The valve 1 is shown on an enlarged scale in FIGS. 2 and 3. There extends through the wall 2 a tube 5 with an annular flange 6 at the front (outer) end. There is coaxially with the tube 5 in the interior of the same arranged a cylinder 7 with a considerably smaller diameter than the tube 5 in such a way that an annular space 8 is formed between them. The cylinder 7 is at its inner end provided with an end gable 9 and at the outer end with an annular flange 10 extendin gout to and covering the annular flange 6. There is outside the cylinder 7 axially arranged a tube-shaped directing screen 11 having at its inner end an annular flange 12 which abuts against the outside of the annular flange 10. The diameter of the directing screen 11 is considerably greater than the diameter of the tube 7. The annular flanges 6, 10, and 12 are interconnected, e.g. by means of bolts. In the interior of the cylinder 7 there is axially displaceable a tube-shaped slide 13 which at its inner (rear) end is provided with an end gable 14 and at its outer end with an annular flange 15 reaching with its radially outer border almost out to the directing screen 11. The mantle 16 of the slide 13 is provided with a number of openings 17 which in a certain position (the operative position according to FIG. 2) register with a corresponding number of openings 18 in the mantle 19 of the cylinder 7. A number of bolts 20 (only two shown) projects inwardly from the gable 9, said bolts extending through apertures 21 in the gable 14 of the tube slide 13 and being each at their free ends provided with a nut 22. Helical springs 23 are inserted between the gables 9 and 14 and between the gable 14 and the nut 22 in question there are inserted arcuate leaf springs 24.

Due to the cooperation of the springs 23 and 24, the slide 13 is normally held in the operative position shown in FIG. 2, in which position the shelter 3 via the annular space 8 and the openings 18 and 17 is in communication with the surrounding air. Thus, fresh air can be sucked into the shelter by means of the fans (not shown) of the shelter. The negative pressure in the shelter 3 has no influence at all on the position of the slide 13. However, when a pressure wave reaches the wall 2 of the shelter, the slide is pressed against the action of the springs 23 inwardly (rearwardly) in the cylinder 7, whereby the openings 18 in the tube mantle 19 are closed by the slide mantle 16. The flange 15 abuts in the rear position of the slide (FIG. 3) against the annular flange 10. Thus, the pressure wave is effectively stopped by the slide 13. At the subsequent suction wave the slide 13 is pulled somewhat outwardly (to the left according to FIG. 3) whereas the movement is braked by the springs 24 before the gable 14 abuts against the nuts 22.

The fluid shutting valve 25 shown in FIG. 1 is supposed to be incorporated in a drain pipe 26 from the shelter 3. In FIGS. 4 and 5 such a shutting valve is shown on an enlarged scale. The drain pipe 26 is provided with an elongation portion 27 and a tube piece 28 extends perpendicularly from the elongation portion 27. In the elongation portion 27 there is axially displaceable a tube-shaped slide 29 having an end gable 30 with a lateral opening 31 situated exactly in front of the tube piece 28 when the tube-shaped slide with its outer (front) end abuts against a stop ring 32 in the drain pipe 26. There extends from the gable 30 rearwardly out through a hole in an end cover 34 on the free end of the elongation portion 27 a guide rail 35 which as shown in FIG. 5 has a rectangular cross section fitting a corresponding cross section of the hole 33 in the cover 34. A helical spring 36 is inserted between the gable 30 and the cover 34. At the rear end (the right one according to FIG. 4) of the elongation portion 27 there is arranged a buffer 37 of hard rubber or some similar resilient material.

When a pressure wave reaches the shelter 3 and the liquid in the pipe 26 is pressed rearwardly, the slide 29 is also displaced rearwardly against the action of the spring 36 (to the right according to FIG. 4) whereas the slide completely closes the entrance to the pipe 26 via the tube piece 28. For this reason no liquid can be pressed rearwardly in the tube piece 28. The liquid is quite simply "cut off" by means of the slide 29 at the side of the tube piece 28. The guide rail 35 prevents the slide 29 from turning in the interior of the elongation portion 27 during its axial displacement.

The invention has been described in the aforegoing for purposes of illustration only and is not intended to be limited by this specific description. Thus, the shutting valve 25 may be incorporated in other pipes or conduits than drain pipes, for example, in oil pipes or conduits for liquid fuel from containers.

What I claim is:

1. A bomb shelter or other shelter type shutting valve assembly having a resiliently biased normally open position and forward and reverse closing positions comprising in combination:
   (a) a housing means including a cylindrical apertured housing tube (7);
   (b) a tubular shutting valve body (13) including a mantle sleeve having a closed inner end wall (14) with inside and outside faces, and slidably disposed within said cylindrical housing tube (7), the mantle sleeve having apertures which register with corresponding apertures formed in the said housing tube (7) when in the normally open position;
   (c) resilient means including first (23) and second (24) resilient members disposed closely adjacent both inside and outside faces of said closed end wall (14) and within said housing tube (7) to resiliently bias the valve body (13) in the normally open position;
   (d) said valve body (13) being displaceable against the resilience of the first resilient members (23) responsive to positive atmospheric fluid pressure shock waves to instantly close said valve in a first or forward closed position to preclude shock waves from entering the shelter; and
   (e) said second resilient members reacting against the outside face of the end wall (14) simultaneously with a subsequent quick following negative fluid pressure condition to resiliently shift said valve body (13) in the opposite direction immediately to a second or reverse closed position opposed to that of the first closed position.

2. A shutting valve assembly of the type as defined in claim 1 which may be used in connection with a bomb or other type shelter, wherein said housing tube (7) is provided with a closed end wall (9) disposed toward the inside of said shelter, and said first resilient means (23) are interposed between the respective end walls (14) and (9) of the valve body (13) and the housing tube (7).

3. A shutting valve assembly as defined in claim 2 wherein the resilient means include stud guide means upon which the valve body (13) is guided and upon which said resilient members are mounted, said stud guide means formed to preclude relative rotation of the valve body (13) and housing tube (7) and including a plurality of rigid studs (20) having one end of each fixedly attached to said end wall (9) of said housing tube (7) and having a free end projecting in an axial direction through complemental formed apertures in said end wall (14) of the valve body, and stop means (22) on the free ends of said studs against which the second resilient members (24) seat.

4. A shutting valve assembly as defined in claim 1 wherein the resilient means include valve-body-guide stud means upon which the resilient members are mounted and which are formed to preclude rotation of the shutting valve body (13) relative to the housing tube (7) about the longitudinal axis.

5. A shutting valve assembly as defined in claim 1, which may be used in association with a bomb or other type of shelter, wherein the housing tube (7) is provided with a transverse radially outwardly extended wall portion (10); a circumferentially enclosed guide sleeve member (11) adjacent to and projecting outwardly away from the shelter and said radially extended wall portion (10), and said shutting body (13) provided with a radially outwardly extended flange (15) of slightly smaller circumferential extent than that of guide sleeve member (11).

6. A shutting valve assembly as defined in claim 1 wherein the housing means include an elongated tubular sleeve member (5) of substantially larger diameter than said housing tube (7) and being open at its inner end and in closed contact with said housing tube at its outer end, said housing tube (7) and housing sleeve member (5) are coaxially disposed to define a uniform annular fluid chamber therebetween.

References Cited

UNITED STATES PATENTS

| | | | |
|---|---|---|---|
| 531,304 | 12/1894 | Dousman | 137—505.13 |
| 1,075,662 | 10/1913 | McKinley | 137—508 X |
| 1,364,001 | 12/1920 | Shadduck | 137—517 |
| 1,609,472 | 12/1926 | Heil et al. | 137—517 X |
| 2,673,450 | 3/1954 | Wolf | 137—517 X |
| 3,129,648 | 4/1964 | Hoff | 98—1 X |
| 3,140,648 | 7/1964 | Bergman et al. | 98—119 |

FOREIGN PATENTS 357,250 11/1961 Switzerland.

WILLIAM F. O'DEA, Primary Examiner

D. J. ZOBKIW, Assistant Examiner

U.S. Cl. X.R.

98—119